US006804718B1

(12) United States Patent
Pang et al.

(10) Patent No.: US 6,804,718 B1
(45) Date of Patent: *Oct. 12, 2004

(54) COMPUTING SYSTEM AND METHOD FOR MIGRATING A MOBILE COMPUTING ENVIRONMENT

(75) Inventors: Hwee Hwa Pang, Singapore (SG); Sridharan Rangarajan, Singapore (SG)

(73) Assignee: Kent Ridge Digital Labs, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 09/525,590

(22) Filed: Mar. 15, 2000

(30) Foreign Application Priority Data

Mar. 18, 1999 (WO) ............................... PCT/SG99/00037
Jul. 24, 1999 (SG) .......................................... 9903604-8

(51) Int. Cl.[7] ........................ G06F 15/173; G06F 15/16
(52) U.S. Cl. ..................................... 709/226; 709/224
(58) Field of Search ............................. 707/4; 713/201; 705/44; 370/463; 709/203, 226

(56) References Cited

U.S. PATENT DOCUMENTS

| 5,561,799 | A | | 10/1996 | Khalidi et al. ............... 395/600 |
| 5,708,812 | A | * | 1/1998 | Van Dyke et al. ........... 717/171 |
| 5,845,282 | A | | 12/1998 | Alley et al. .................... 707/10 |
| 5,864,853 | A | | 1/1999 | Kimura et al. ................. 707/10 |
| 5,987,440 | A | * | 11/1999 | O'Neil et al. .................. 705/44 |
| 6,073,242 | A | * | 6/2000 | Hardy et al. ................. 713/201 |
| 6,240,442 | B1 | * | 5/2001 | Domenikos et al. ........ 709/203 |
| 6,341,353 | B1 | * | 1/2002 | Herman et al. ............. 713/201 |
| 6,389,427 | B1 | * | 5/2002 | Faulkner ................... 707/104.1 |
| 6,401,085 | B1 | * | 6/2002 | Gershman et al. ............. 707/4 |
| 6,542,515 | B1 | * | 4/2003 | Kumar et al. ............... 370/463 |
| 6,629,143 | B1 | * | 9/2003 | Pang .......................... 709/226 |

FOREIGN PATENT DOCUMENTS

| EP | 0774723 | 5/1997 |
| WO | 9746956 | 12/1997 |

* cited by examiner

Primary Examiner—Ayaz Sheikh
Assistant Examiner—Christian LaForgia
(74) Attorney, Agent, or Firm—Conley Rose, P.C.

(57) ABSTRACT

A computing system for enabling the migration of a mobile computing environment to provide a consistent computing environment for a user is disclosed. The computing system is connectable to remote storage and has a local computing environment, an operating system, and a local storage. It also includes a means for mapping a user-interface portion of the mobile computing environment onto the local computing environment using information transferred from said remote storage being connected to the system, the mapping means being actuable by the user. The computer system further includes a file system in the operating system for receiving and translating requests for performing file operations on the local storage. There is also included a means for monitoring and intercepting a request made to the file system for operation on a file, the request being actuable by the mapped user-interface and the file being stored on a said remote storage being connected to the system.

42 Claims, 11 Drawing Sheets

COMPUTING SYSTEM AND METHOD FOR MIGRATING A MOBILE COMPUTING ENVIRONMENT

FIELD OF THE INVENTION

The present invention relates generally to the field of computing environments. In particular, the present invention relates to portable or mobile computing within the context of a network in which a computing environment may be migrated to a computer that is connectable to the network for providing a user with a consistent computing environment.

BACKGROUND

Historically, computers were large and expensive processors that were sited at special premises and that few could afford to own and maintain, respectively. To obtain benefit from the then powerful computing and processing capabilities of a computer of the past, a user had to access the premises where the computer is sited and take multiple steps and procedures that are unique to the computer in order to operate the computer.

Currently, through technological evolution, one of the successors of these large and expensive computers is a small and affordable notebook computer. More importantly, however, such a notebook computer may provide computing power with the ability to execute complex formulae involving large numbers at high processing speeds. Such an evolution in computing technology is made possible partially because of the advent of integrated circuit technology that enables the integration of electronic circuits into small electronic devices. The advancement of technology and related skills in manufacturing and software programming and/or engineering also contributes to this evolution.

The evolution of computer technology also significantly impacts the evolution of network technology. Modern network technology allows users who are connected to a network to share resources that are connected to the network. Currently, networks can either cover a small geographical area, such as a local area network (LAN), or a wide geographical area, such as the coverage provided by the Internet. Recognising the market potential of coupling modern computing technology that provides for small, portable, and powerful computers, and the wide coverage of the Internet, the computer industry has placed many modern computing products and services of sorts on the computer marketplace.

One example of such products and services currently being commercialized is based on the concept of mobile computing with minimal local storage usage. This means that modern mobile computer manufacturers can leverage off the implementation of minimal local storage such as the local hard disk, therefore accentuating the compactness of modem mobile computers. The modern mobile computer can therefore be dedicated to, for example, communications and image processing.

Another example of the products and services currently being commercialized is based on the concept of a "mobile" user. The mobile user is not necessarily a computer user who uses a modern mobile computer. Rather, the mobile user can also refer to one that hops from computer to computer within a "boundary" defined by a network to which the mobile user subscribes or is connectable. The mobile user thus performs work with whichever computer the mobile user accesses within the network.

When any computer user uses a computer, the computer user is basically dealing with a set or sets of information through the computer's processor. Generally, the information is found on a local storage device such as the local hard disk or a storage medium such as a CD ROM. However, the information may also reside on a remote storage which is accessible through a network. Regardless of the storage location, the mobile user fundamentally requires that the computer provides a means of storing and/or retrieving the information that the mobile user deals with. For example, when the mobile user hops from computer to computer, the computer user may either use floppy diskettes, CD ROMs, card memories, or any other form of storage medium for providing the information that the mobile user is dealing with. To minimize the use of such storage media that need to be transported, remote storage may be used. When the mobile user wishes to access a remote storage, the mobile user is required to connect to another computer controlling the remote storage either directly or through a network. Such a network could either cover a small geographical area such as a LAN, or a wide geographical area such as the Internet.

In both examples, there appears to exist advantages to using remote storage for the above reasons of either improving the compactness of the modem mobile computer or lessening the need to transport the above mentioned storage media.

Currently, some Internet-based products or services such as Web portals to which a computer user may subscribe provides an account with an electronic mailbox, a personal starting Web page, and a file directory. These can be accessed from any computer the subscriber uses as long as a Web browser application program and an Internet link are available on that computer. All the subscriber needs to do is to login to the Web portal account and thus is able to use the mailbox or access a file from the file directory that is provided by the account. This is a very useful concept of providing computer users with access to the same information and resources at all times regardless of whether the computer users are at home, in the office, or travelling. This idea is made possible only through remote storage access.

However, one shortcoming that exists with a Web portal product or service is that basically a Web portal account is accessible only through a Web Browser. This means that the Web portal account is distinct from the subscriber's other local network or remote access accounts that may exist at the office, on the home computer, and with any Internet service provider. Only the email component of the Web portal account may be integrated with the subscriber's other accounts using protocols such as POP3 or IMAP. A practical consequence of this is that a data file cannot be opened directly if the required program is installed on another account. Instead, such a file has to be moved manually to that account first. Another shortcoming is that the subscriber has to work with different environment settings, shortcuts, directory structures, and the like, when the subscriber works on the different accounts from the different computers. Such are components of a computing environment that includes the "look and feel" of the user interface, file access, directory access, and execution of application program of a computer.

In an attempt to overcome one or more of the above problems, conventional methods exist in the marketplace. One such conventional method addresses the problem of locating files residing on different file directories of different accounts by using file attributes. From the file attributes, it can be determined if for example a requested file is located on the local storage of the computer or on a remote storage. If the file attribute of a file indicates that the requested file is stored on the remote storage, a file system driver in the operating system of the computer passes control to high level drivers to continue processing the request as an input/ output (I/O) request. However, such a conventional method does not address the problem adequately because only remote storage supported by communications protocols congruent with the communications protocols supported by the operating system is accessible. Moreover, such a conventional method does not specifically address the other problems.

Another conventional method addresses the problem of accessing different resources on the Web through overwriting shared libraries used by application programs on the computer. This however implies that such a conventional method cannot support application programs that utilize static libraries. Hence, the application of such a conventional method is restricted to access of files by application programs that utilize only shared libraries. Moreover, such a conventional method also does not address the problem adequately because there is no provision to access remote storage on a file server. This conventional method also does not specifically address other problems.

A further conventional method addresses the problem of accessing files through a distributed server environment by use of a central file management device or system that maintains a virtual file management table for indicating the virtual identification (ID) and the physical location of files. Requests originating from application programs for files are directed from the central file management system to the appropriate server based on the actual physical location of the files. This conventional method however involves additional hardware, software, firmware, and the like for providing the central file management system. This implies additional cost and effort on implementation of such a conventional method, which is not desirable. Also, this conventional method does not specifically address the other problems.

It is clear from the above prior art and conventional methods that a need exists for an adequate solution to at least one or a combination of the problems disclosed. The desirable effects of this solution should provide a means to integrate the environment settings, application programs and files of accounts belonging to a subscriber so that a consistent computing environment is achieved. This consistent computing environment should be attachable to and detachable from any computer a computer user is using, regardless of the location of the computer as long as the computer is connectable to a network that provides the appropriate resources.

SUMMARY

Various aspects of the invention are directed to ameliorating or overcoming at least one or a combination of the above disadvantages or inadequacies of prior art and conventional methods. In particular, it is desirable to provide portable or mobile computing within the context of a network wherein a computing environment may be migrated to any computer that is connectable to the network for providing a user with a consistent computing environment. It is also desirable to provide a consistent computing environment according to a dynamically adaptable communications protocol that allows transparent connectivity to Web resources, file servers and the like. It is further desirable to provide a consistent computing environment wherein the information regarding files stored on remote storage is self-contained within the computer.

In accordance with a first aspect of the invention there is disclosed a computing system for enabling the migration of a mobile computing environment thereto to provide a consistent computing environment for a user, the computing system being connectable to remote storage and having a local computing environment, an operating system, and a local storage, the computing system including: means for mapping a user-interface portion of the mobile computing environment onto the local computing environment using information transferred from said remote storage being connected to the system, the mapping means being actuable by the user; a file system in the operating system for receiving and translating requests for performing file operations on the local storage; and means for monitoring and intercepting a request made to the file system for operation on a file, the request being actuable by the mapped user-interface and the file being stored on said remote storage being connected to the system.

In accordance with a second aspect of the invention there is disclosed a method of migrating a mobile computing environment to a computing system for providing a consistent computing environment for a user, the computing system being connectable to remote storage and having a local computing environment, an operating system, and a local storage, the method including the steps of: mapping a user-interface portion of the mobile computing environment onto the local computing environment, the step including transferring information stored on said remote storage being connected to the computing system, and using the transferred information for mapping the user-interface, the step of mapping being actuated by the user; receiving and translating requests in a file system in the operating system for performing file operations on the local storage; and monitoring and intercepting a request made to the file system for operation on a file, the request being actuated by the mapped user-interface and the file being stored on said remote storage being connected to the computing system.

In accordance with a third aspect of the invention there is disclosed a computer program product for providing a consistent computing environment for a user, including: a computer usable medium having computer readable program code means embodied in the medium for causing migration of a mobile computing environment to a computing system, the computing system being connectable to remote storage and having a local computing environment, an operating system, and a local storage, the computer program product having: computer readable program code means for mapping a user-interface portion of the mobile computing environment onto the local computing environment, further including computer readable program code means for transferring information stored on said remote storage being connected to the computing system, and computer readable program code means for using the transferred information for mapping the user-interface, the step of mapping being actuated by the user; computer readable program code means for receiving and translating requests in a file system in the operating system for performing file operations on the local storage; and computer readable program code means for monitoring and intercepting a request made to the file system for operation on a file, the request being actuated by the mapped user-interface and the file being stored on said remote storage being connected to the computing system.

In accordance with a fourth aspect of the invention there is disclosed a computing system for enabling the migration of a mobile computing environment thereto, the computing system being connectable to remote storage and having an operating system that provides a local user-interface and controls a local storage, the computing system including an arbitrator means in the operating system for arbitrating access to files, directories, and information for locating and accessing the files and directories; an account manager means communicable with the arbitrator means and the remote storage for mapping a user-interface portion of the mobile computing environment onto the local user-interface using information stored on the remote storage; a file system in the operating system for receiving and translating requests for performing file operations on the local storage; and a file monitor means for intercepting a request made to the file system for operation on a file, wherein the request is actuated through the mapped local user-interface and the file is stored on the remote storage, and redirecting the request to the remote storage.

BRIEF DESCRIPTION OF THE DRAWINGS

Embodiments of the invention are described hereinafter with reference to the drawings in which.

DETAILED DESCRIPTION

A computing system, a method, and a computer program product for providing portable or mobile computing within the context of a network are described. In particular, a computing environment may be migrated to any computer that is connectable to the network to provide a user with a consistent computing environment. In the following description of several embodiments, numerous details are described in order to provide a more thorough description of these embodiments. It becomes apparent to one skilled in the art, however, that the invention may be practiced without those specific details. In other instances, well-known details have not been described at length so as not to obscure the invention.

The advantages of the embodiments of the invention are manifold. One advantage is that at least one embodiment allows a computer user to use the same application programs or work with the same documents from any computer. The computer user in this instance has multiple network, remote access, or Internet access accounts that are accessible through different computers having compatible operating systems. Through any one of the accounts and using any one of the computers, the computer user can use the application programs or work with the documents as though the application programs or documents are installed or reside on that computer.

Another advantage is that at least one embodiment provides a mobile computing environment which is attachable to different computers having compatible operating systems. As a consequence, the computer user is provided with a consistent and therefore familiar computing environment, regardless of whether the computer user configures that computer or not.

A further advantage is that at least one embodiment enables application programs that are installed on remote servers to which the computer is connected to be executed on that computer.

A yet further advantage is that at least one embodiment provides connectivity between the computer and different types of remote servers through dynamic adaptation of communications protocols. For example, in one instance, the computer user can access a remote server within a LAN to which both the remote server and the computer are connected using one type of communications protocol. In another instance where the computer user is travelling and therefore is outside the firewall of the LAN, another type of communications protocol is used.

A still further advantage is that at least one embodiment provides for encrypted files stored on remote servers to be decrypted only on the computer that the computer user is using. This provides a security measure and thus ensures that the computer user can safely use remote servers that may be accessible to the public for remote storage. Such a security measure remains transparent to the computer user and the application program that is being used.

Figure 1:
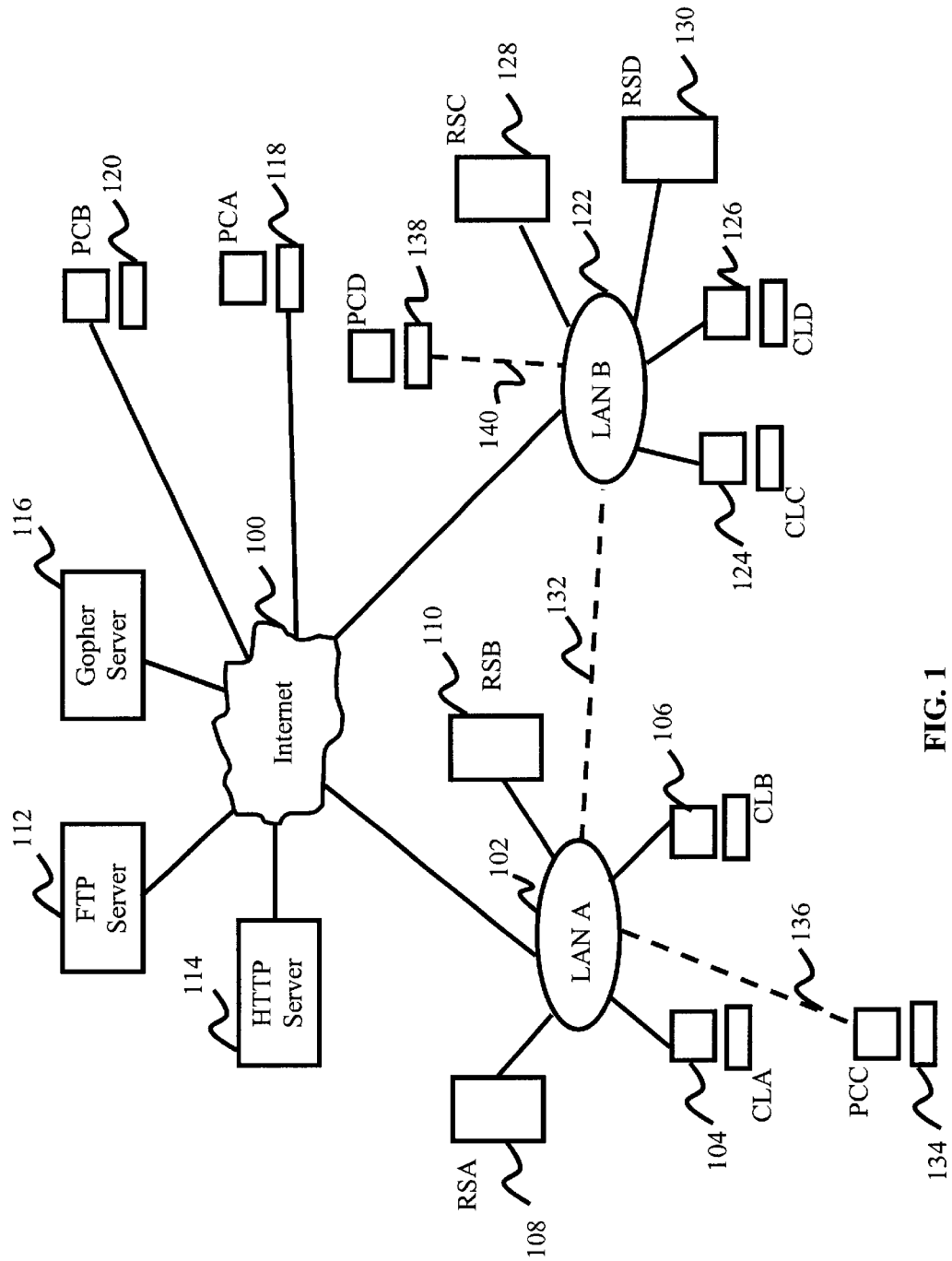
FIG. 1 is a contextual block diagram depicting a client according to a preferred embodiment of the invention connected to a LAN and to the Internet through the LAN.

FIG. 1 is a contextual block diagram of a mobile computing environment network formed by the Internet 100 and a network LAN A 102, to which a number of client computers (generally hereinafter known as clients) according to a preferred embodiment of the invention are connected. The LAN A 102 is connected to the Internet 100 and therefore provides the clients access to the resources on the Internet 100, preferably through a firewall. Connected to the LAN A 102 are a number of clients such as CL A 104 and CL B 106. The LAN A 102 importantly provides the CL A 104 and CL B 106 with access to remote storage on remote servers RS A 108 and RS B 110, which are also connected to the LAN A 102. The LAN A 102 is a typical network implementation in an organization that networks the clients and the remote servers within the boundary of the geographical area resided by the organization.

Connected to the Internet 100 are resources such as an FTP server 112, an HTTP or Web server 114, and a Gopher server 116, which may be provided by organizations or individuals and are well known to those skilled in the art. In addition, there are typically individuals or small organizations that connect or link to the Internet 100 through personal computers that are given the designations PC A 118 and PC B 120. These individuals or small organizations are typically connected to the Internet 100 via Internet service providers.

Also shown in FIG. 1 is another network LAN B 122 to which clients CL C 124 and CL D 126, and remote servers RS C 128 and RS D 130 are connected. The LAN B 122 is also a typical network implementation in an organization. The LAN A 102 and the LAN B 122 are connected via a communications link 132, creating a virtual private network between the two organizations. The communications link 132 is a logical communications link and may be implemented through the Internet 100 or a direct or dedicated communications link.

A personal computer PC C 134 is also connected to the LAN A 102 via a remote access connection 136 to a remote access server (not shown). The remote access connection 136 is typically a dial-in connection such as one provided by modems. Alternatively, the remote access connection 136 may also be established via the Internet 100. Similarly, a personal computer PC D 138 is also connected to the LAN B 122 in the same manner.

To one skilled in the art, any of the personal computers PCs A, B, C, D (118, 120, 134, 138) may be a mobile computer provided with a conventional communications link such as one provided by a modem and a wire line or wireless telecommunications link. Alternatively, each of these PCs may be a computer at an Internet kiosk.

Each of the clients and the personal computers are provided with a MICROSOFT WINDOWS 95™ or compatible operating system Hence, the computing environment of each of these computers includes the "look and feel" of the WINDOWS™ or compatible operating system user interface, and files, directories, and application programs access. A consistent WINDOWS™ or compatible operating system computing environment is therefore one that is available to a computer user regardless of whichever of the WINDOWS™ or compatible operating system clients and personal computers the computer user chooses to use. The computing environment is attachable to and detachable from the chosen client or personal computer. For purposes of maintaining a consistent computing environment, the information pertaining to the computing environment is updated at the source of the information before detachment if the computer user has changed the computing environment. This therefore enables the consistent WINDOWS™ or compatible operating system computing environment to provide the computer user with familiar WINDOWS™ or compatible operating system settings and user interface as long as the computer user connects to the mobile computing environment network.

Every computer user who has access to the mobile computing environment network is provided with an account for attaching that computer user's unique or personalized consistent WINDOWS™ or compatible operating system computing environment to any of the clients or personal computers connected to the mobile computing environment network. Hence, a computer user may on one day attach the personalized consistent WINDOWS™ or compatible operating system computing environment to the CL A 104 and on another day attach the same to the PC B 120 because the computer user is travelling.

To attach a consistent WINDOWS™ or compatible operating system computing environment to a computer connected to the mobile computing environment network, the computer user has to access the computer user's mobile computing environment account through the network account, remote access account, or Internet access account that the computer user has access to. A network account typically allows the computer user to access the LAN A 102 from within the organization that implements the LAN A 102, thereby providing the computer user access to remote storage on the remote servers RS A 108 and RS B 110. A remote access account typically allows the computer user to access the LAN A 102 from outside the organization's firewall. An Internet access account typically provides the computer user with access to the resources on the Internet 100 and also the Internet service provider's host resources.

Figure 7A:
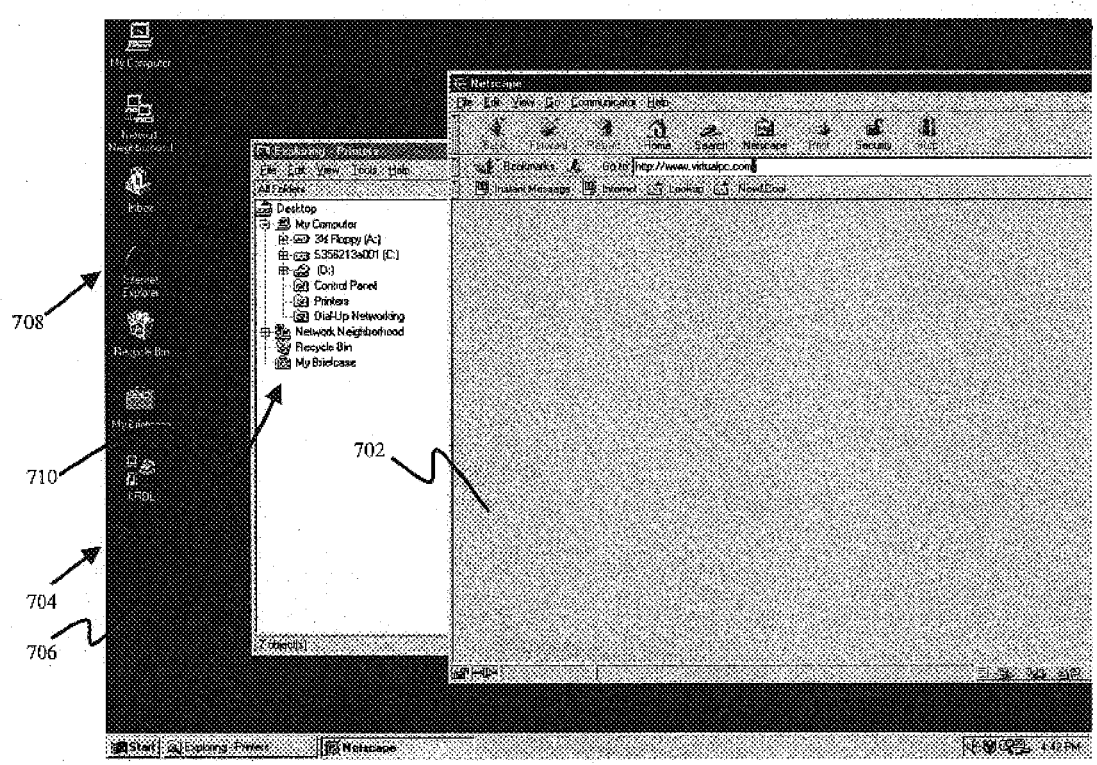
FIGS. 7a and 7b respectively illustrate examples of the components of an original computing environment and a consistent computing environment migrated onto the client shown in FIG. 1 wherein the user interface, file access, directory access, and shortcuts to application programs are provided.

The computer user's mobile environment account through any of these accounts is accessed using a WINDOWS™ or compatible operating system Internet browsing application program. One well-known browsing application program Netscape Navigator is shown in FIG. 7A and designated as browser 702. Other browsers, known to those skilled in the art such as Internet Explorer may be used as well. FIG. 7A also shows the other components of a WINDOWS™ or compatible operating system computing environment, such as a WINDOWS™ or compatible operating system desktop 704 displaying a wallpaper 706, a group of icons 708, and a directory mapping 710.

Once the computer user accesses the mobile environment account using the browser window 702, the computer user's personalized consistent WINDOWS™ or compatible operating system computing environment is attached to the computer. The WINDOWS™ or compatible operating system desktop 704 is transformed to provide the personalized consistent WINDOWS™ or compatible operating system computer environment to the computer user.

Figure 7B:
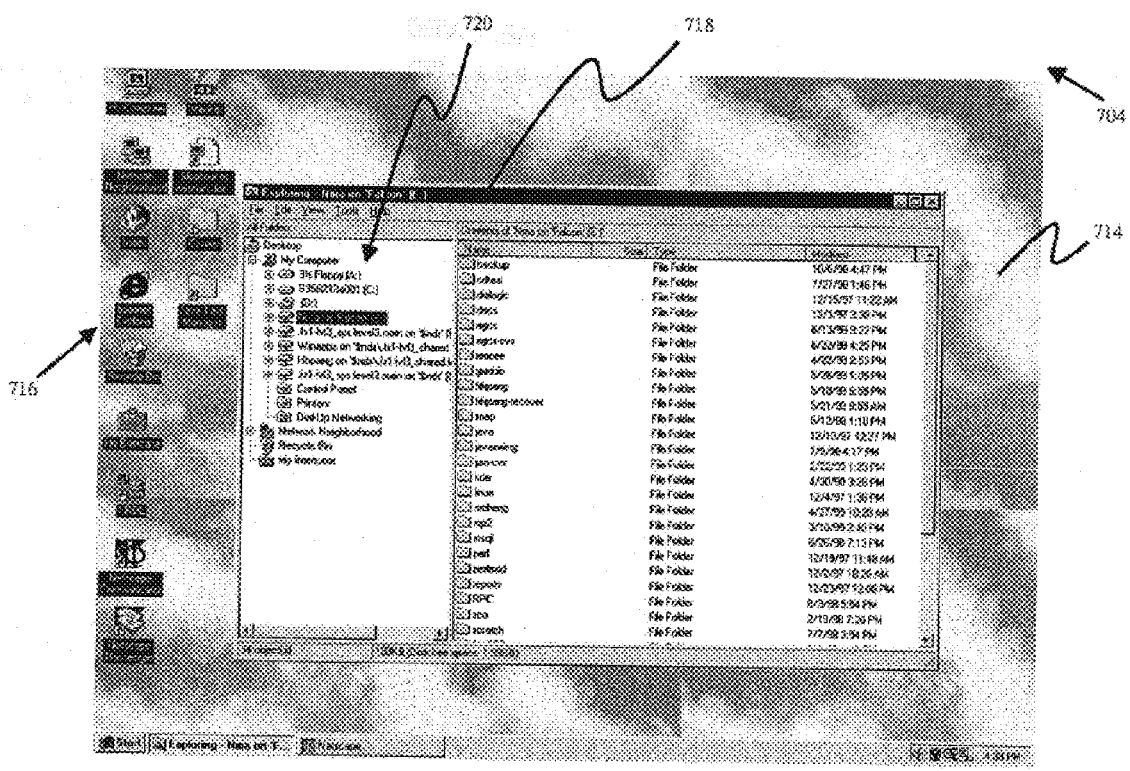

Components of the computer's personalized consistent WINDOWS™ or compatible operating system computing environment are shown in FIG. 7B, which includes the WINDOWS™ or compatible operating system desktop 704 displaying a new wallpaper 714, a new group of icons 716, and an active window 718. The active window 718 provides a new directory mapping 720, which shows directories on whichever of the network access, remote access, or Internet access account the computer user uses to access the mobile computing environment account. The new directory mapping 720 also shows directories on the local storage of the computer the computer user is using, and also on the mobile computing environment account.

Some of the icons in the new group of icons 716 are shortcuts to some documents found on the virtual directories mapped in the active window 718, while some are shortcuts to application programs installed on those directories. The other icons 716 are associated with documents and application programs local to the computer.

The personalized consistent WINDOWS™ or compatible operating system computing environment is then detached from the computer after the computer user no longer requires working with the personalized WINDOWS™ or compatible operating system computing environment. The operations involving attaching a consistent computing environment to and detaching the same from a computer are described hereinafter with reference to FIGS. 2–6.

Figure 2:
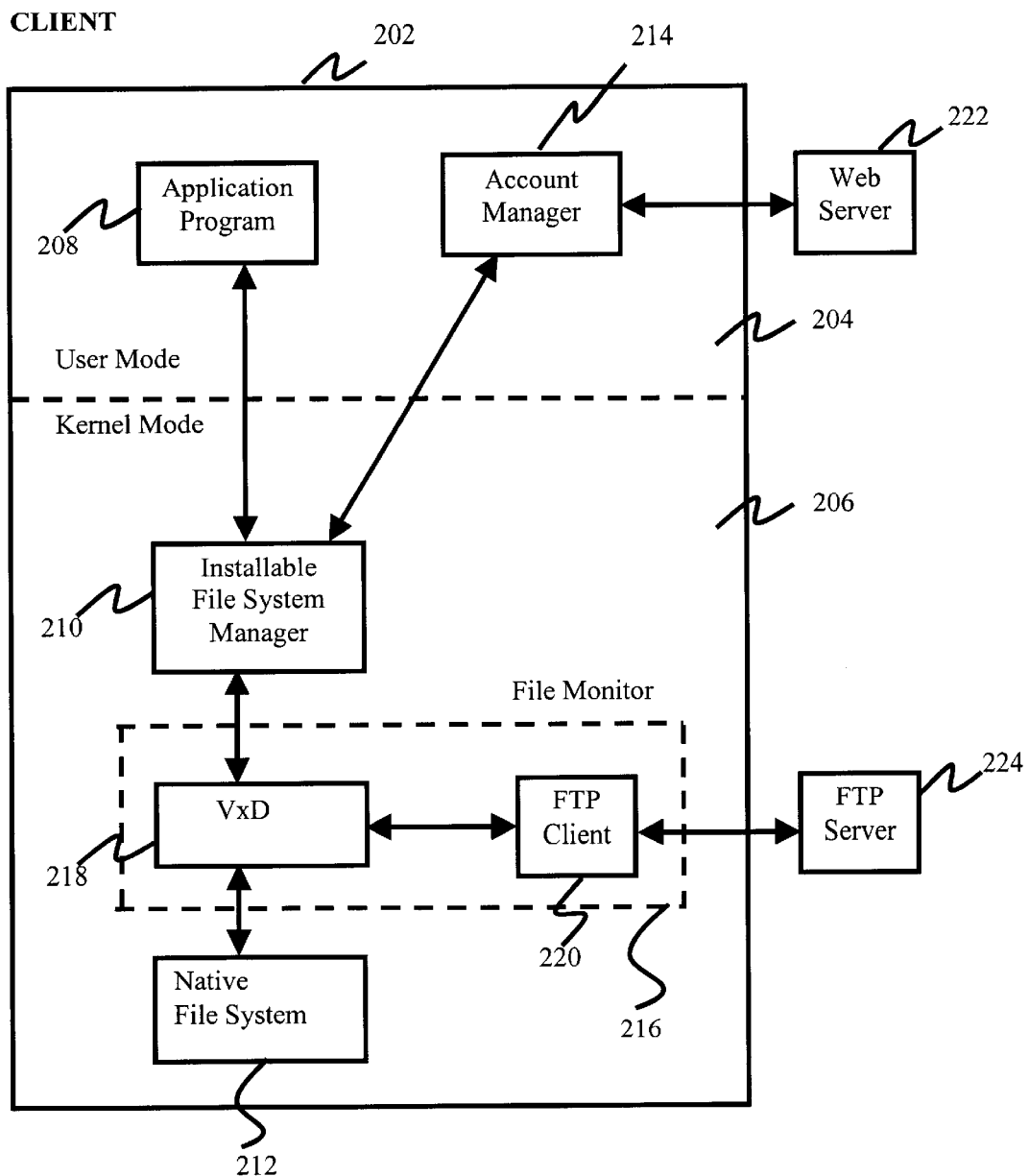
FIG. 2 is a block diagram illustrating the components of the client shown in FIG. 1 and the logical connections to the LAN and the Internet.

In FIG. 2, a diagram illustrates the components or modules in a client or personal computer according to the preferred embodiment of the invention. Such components may be implemented through hardware, software, firmware, or a combination of these. For purposes of brevity, a reference made hereinafter to a client 202 refers to any of the clients or personal computers connected to the mobile computing environment network. Hence, in the client 202, there exist two modes: a user mode 204 and a Kernel mode 206. The user mode 204 generally refers to that part of the client 202 that interacts with the computer user or extrinsic devices, and the Kernel mode 206 generally refers to the WINDOWS™ or compatible operating system of the client 202. An example of a component of the user mode 204 is an application program 208 and examples of the components of the kernel mode 206 are an Installable File System Manager 210 and a Native File System 212. When the computer user accesses the mobile computing environment account from the browser 702, an Account Manager 214 and a File Monitor 216 are invoked. The Account Manager 214 is an application program and therefore is part of the user mode 204. The File Monitor 216 has two components: a Virtual Device Driver 218 and an FTP Client 220. The Virtual Device Driver 218 is a hook within the kernel mode 206 that is layered over the Native File System 212 and thus remains in the kernel mode 206. The FTP Client 220 is another program in the kernel mode 206.

The mobile computing environment account according to the preferred embodiment is provided by a Web portal service. Hence upon accessing the Web portal account, the client 202 gains access to a Web Server 222 through the Account Manager 214. On the other hand, the FTP client 220, as the name suggests, provides the client 202 access to an FTP Server 224. The Account Manager 214 attaches the computer user's personalized WINDOWS™ or compatible operating system computing environment to the client 202. The Account Manager 214 also uploads changes to the computer user's personalized WINDOWS™ or compatible operating system computing environment to the Web Server 222, and thereafter restores the original computing environment to the client 202 when the computer user exits the Web portal account.

When the Account Manager 214 attaches the computer user's personalized WINDOWS™ or compatible operating system computing environment to the client 202, the Account Manager 214, amongst other things described hereinbefore, migrates application programs to the client 202 by providing shortcuts to the application programs. To those skilled in the art, to properly run or execute any application program, files associated with and/or used by the application programs must be accessible to the application programs. Since only the shortcuts to application programs are available to the client 202 and the associated files are not for reasons already discussed, a mechanism is therefore provided to redirect the requests for these files to the remote storage of the files. This remote storage is the FTP Server 224 and the Virtual Device Driver 218 intercepts any file system requests made by the shortcuts to the application programs to the Native File System 212. The Virtual Device Driver 218, by intercepting these requests, is able to check these requests and determine if the target files are available locally or on the FTP Server 224. If a target file is found only on the FTP Server 224, the Virtual Device Driver 218 communicates with the FTP Client 220 so that the FTP Client 220 downloads the target file from the FTP Server 224 to the local storage on the client 202. The Virtual Device Driver 218 thereafter directs the Native File System 212 to satisfy the request for the target file by providing the locally stored copy of the target file.

When the FTP Client 220 receives a file from the FTP Server 224, the FTP Client 220 receives an encrypted file for apparent security reasons. The FTP Client 220 thus decrypts the file before saving the file locally on the client 202. Upon detachment of the personalized WINDOWS™ or compatible operating system computing environment, the files that are changed for example as a result of the execution of migrated application programs are encrypted by the FTP Client 220 before the FTP Client 220 transmits the altered files to the FTP Server 224. Such decryption and encryption activities are transparent both to the computer user and to the migrated application programs.

Figure 3:
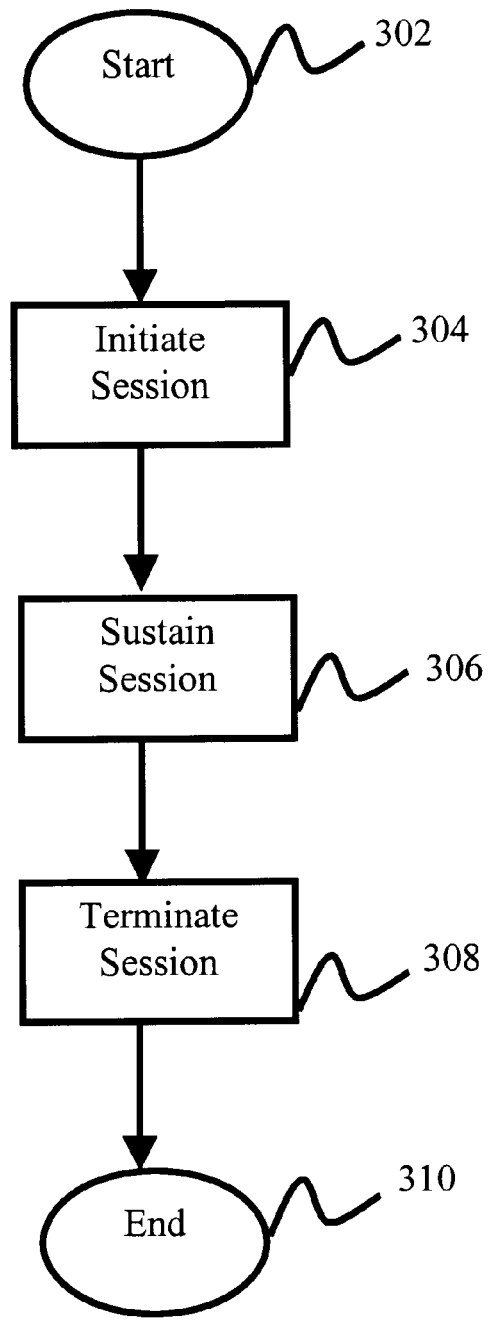
FIG. 3 is a top-level flow diagram illustrating the processes in carried out by the client shown in FIG. 2 for the migration of a consistent computing environment to the client.

For a more detailed description of the operation of the preferred embodiment of the invention, reference is made to FIGS. 3–6. FIG. 3 provides a flow diagram illustrating the three processes carried out by the client 202 for the attachment and detachment of the personalized WINDOWS™ or compatible operating system computing environment. After start up, the client 202 begins a first process known as an Initiate Session process 304. A second process known as a Sustain Session process 306 follows this. The operation then ends with a third process known as a Terminate Session process 308.

In the description of these processes, modules in the client 202 are carried out to produce the desired results or effects. Such modules may be implemented through hardware, software, firmware means, or a combination of these.

Figure 4:
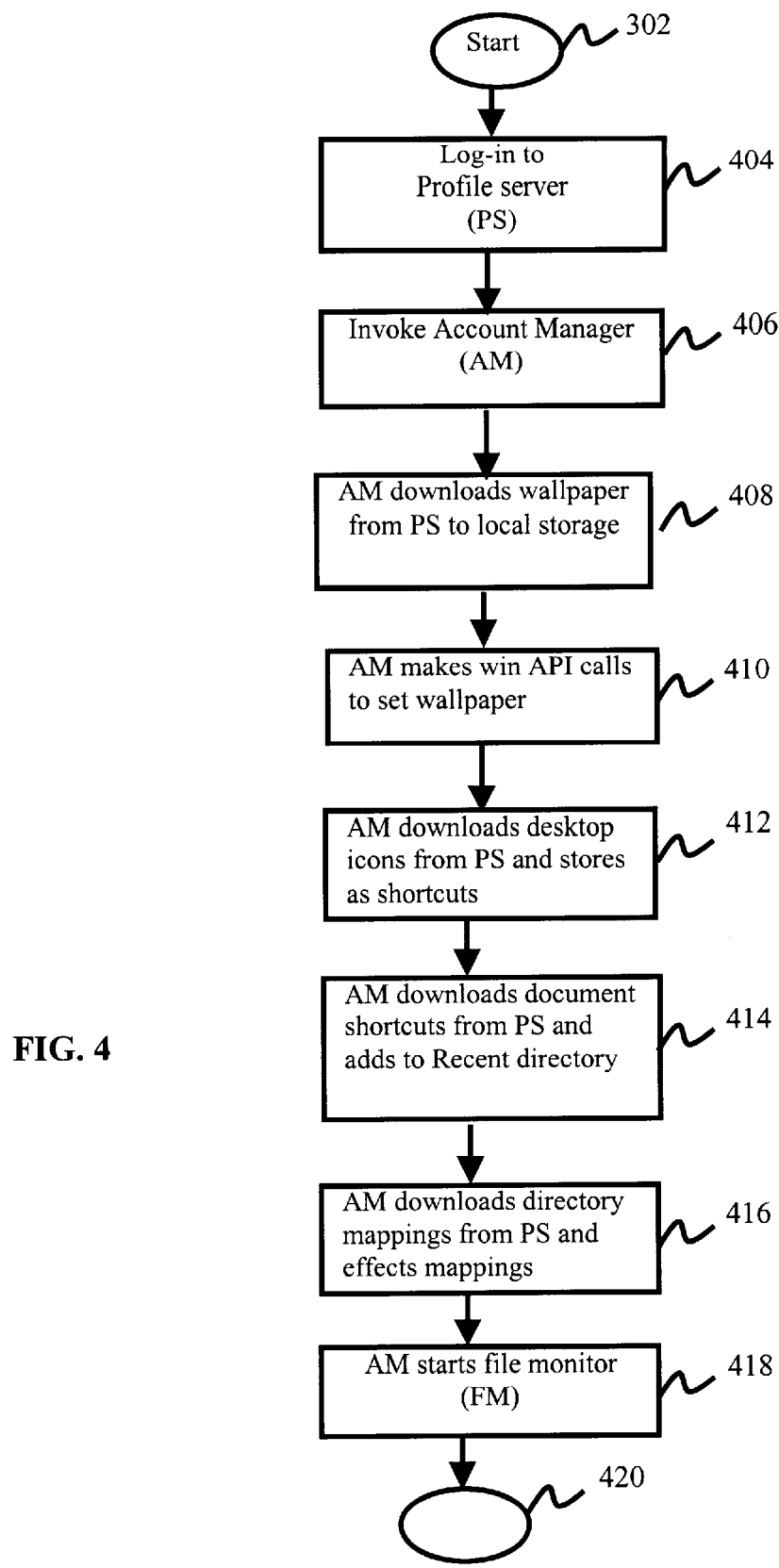
FIG. 4 is a detailed flow diagram illustrating the modules of the Initiate Session process of FIG. 3.

FIG. 4 illustrates the modules involved in carrying out the Initiate Session process 304. After start up, a Login module 404 assumes control and provides access to the Web, or Profile, Server 222. Once access to the Profile Server 222 is gained, an Invoke module 406 assumes control and invokes the Account Manager 214. Thereafter in a Download Wallpaper module 408, the Account Manager 214 downloads a file containing information about the new wallpaper 714 from the Profile Server 222, and stores the file on the local storage on the client 202.

Subsequently in an API Call module 410, the Account Manager 214 makes a WINDOWS™ or compatible operating system API call to change the wallpaper. 706 on the desktop 704 to the new wallpaper 714 according to the file downloaded from the Profile Server 222. WINDOWS™ or compatible operating system API calls are generally known to those skilled in the art for providing an interface between application programs and the WINDOWS™ or compatible operating system.

In a Download Icons module 412, the Account Manager 214 downloads a file containing information for the shortcuts to application programs and documents in the new group of icons 716 from the Profile Server 222, and stores these in the "\WINDOWS™ or compatible operating system\Desktop" directory. The Account Manager 214 further in a Download Document Shortcuts module 414 downloads shortcuts to documents from the Profile Server 222, and adds the shortcuts to the "\WINDOWS™ or compatible operating system\Recent" directory.

The Account Manager 214 then downloads information for the new directory mapping 720 in a Download Mapping module 416 to "mobile desktop" drives on the client 202 from the Profile Server 222. The new directory mapping 720 is effected in the Download Mapping module 416 through a WINDOWS™ or compatible operating system "net use" command or a disk operating system (DOS) "subst" command.

Having performed much of the Initiation Session process 304 through the various modules, the Account Manager 214 ends the current process by starting the Virtual Device Driver 218 and the FTP Client 220 in a Start File Monitor module 418. The personalized WINDOWS™ or compatible operating system computing environment is thereafter successfully attached to the client 202 for the computer user to use.

Figure 5:
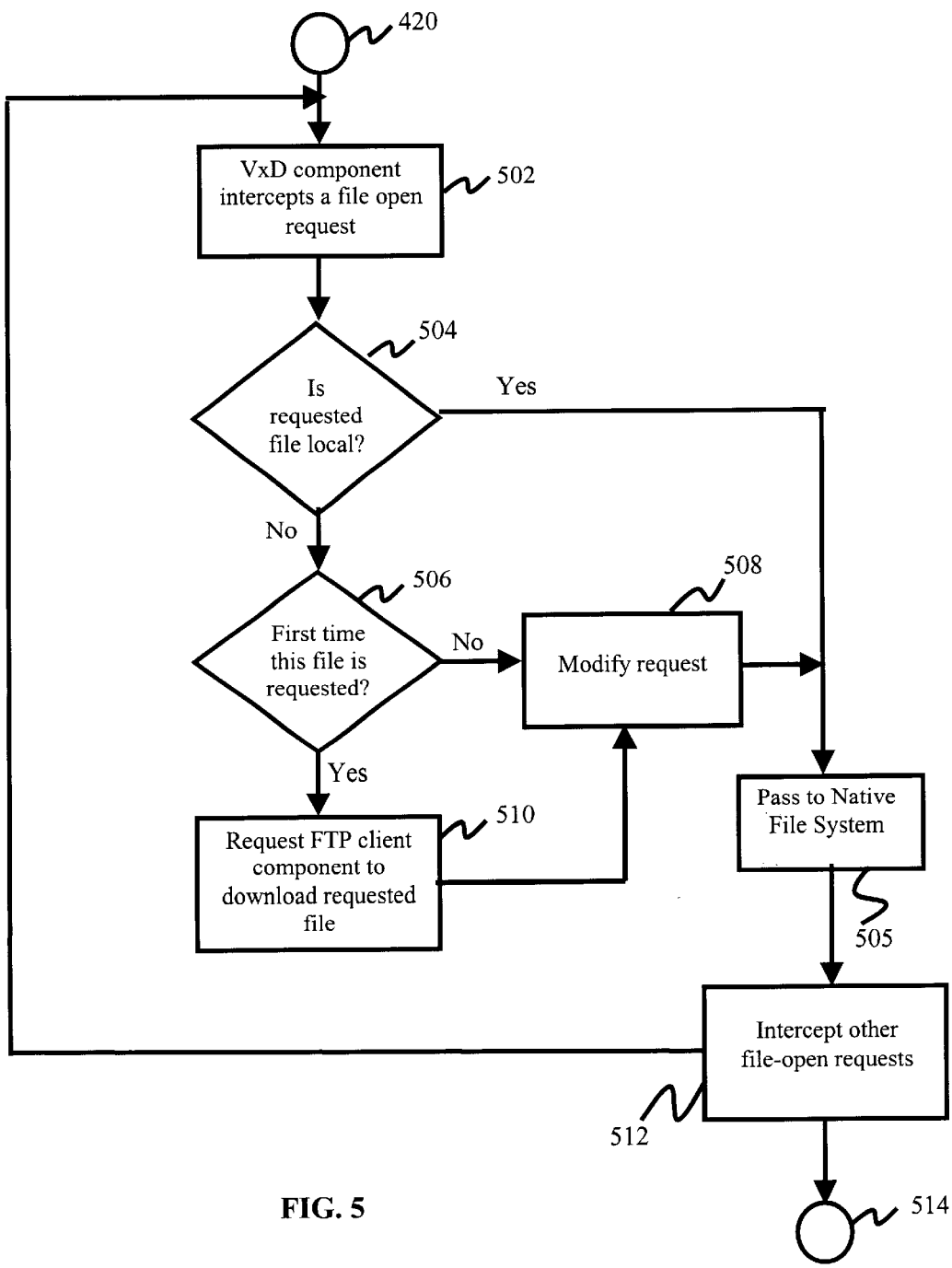
FIG. 5 is a detailed flow diagram illustrating the modules of the Sustain Session process of FIG. 3.
Figure 6:
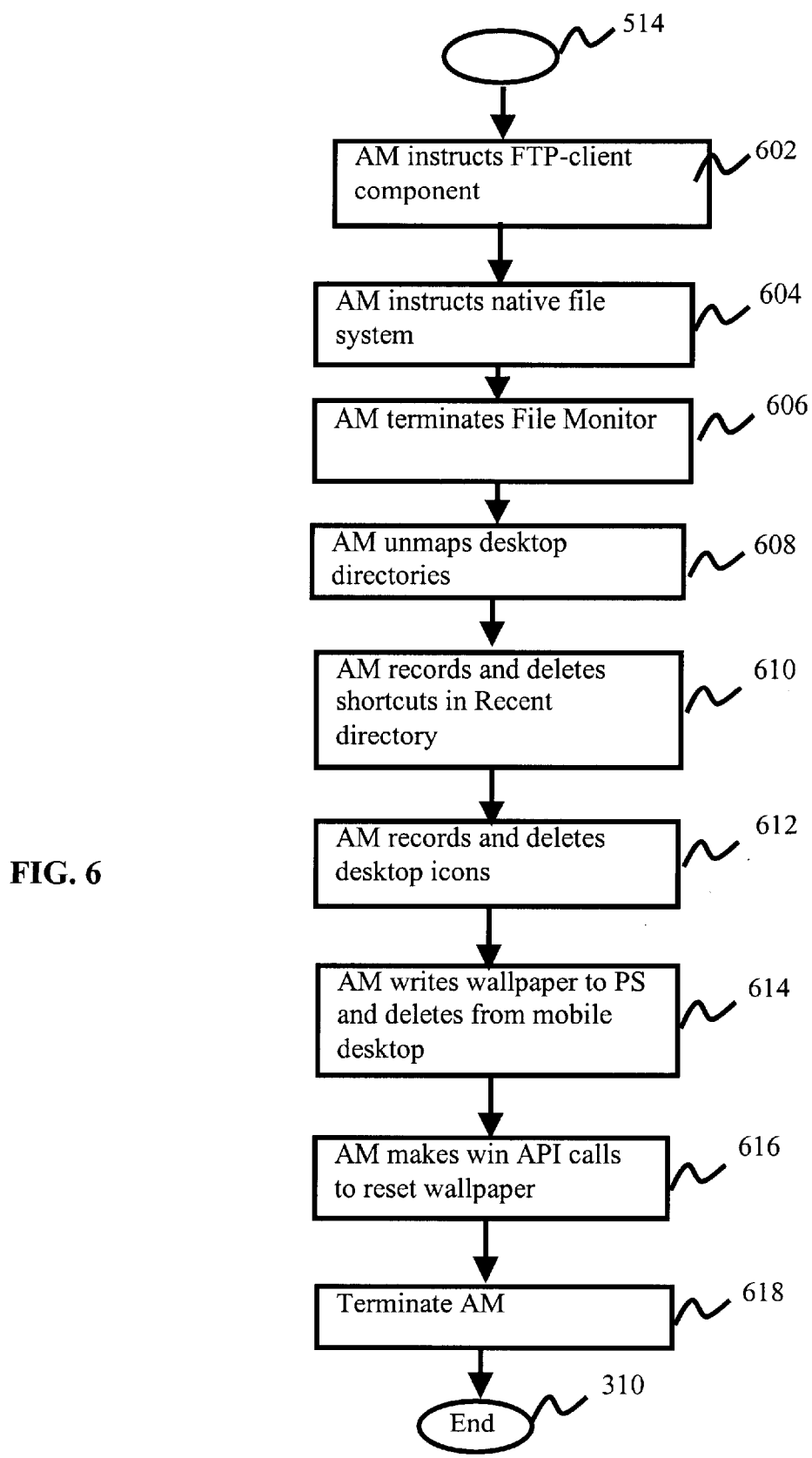
FIG. 6 is a detailed flow diagram illustrating the modules of the Terminate Session process shown in FIG. 3.

The Sustain Session process 306 shown in detail in FIG. 5 commences when the Initiate Session process 304 ends. When the computer user selects to execute the application program 208 in the user mode 204, a file-open request is generated in relation to a file that the application program 208 requires for execution, and is provided as input to the kernel mode 206. The Virtual Device Driver 218 intercepts the file-open request in an Intercept Request module 502, and subsequently performs a check on the file-open request in a Test File Condition module 504. In the Test File Condition module 504, the Virtual Device Driver 218 checks if the file-open request is made to a file residing on local storage on the client 202. If the condition tests true (YES), a Native File System module 505 assumes control and in this module, the Virtual Device Driver 218 provides as input the file-open request to the Native File System 212 for retrieval of the file. Subsequently, an Intercept Other Requests module 512 assumes control and loops the Sustain Session process 306 back to the beginning of the process for intercepting other file-open requests, file-modify requests and directory related requests. Additionally in the Intercept Other Requests module 512, the Virtual Device Driver 218 maintains information of such requests internally.

If in the Test File Condition module 504, the condition tests false (NO), a Test New. Condition module 506 assumes control. In the Test New Condition module 506, the Virtual Device Driver 218 performs another check on the file-open request to determine if the file is being requested for the first time in this session. If the condition tests false (NO), the file-open request is made to a file that has been previously requested and downloaded from the FTP Server 224 to the local storage on the client 202. A Modify Request module 508 then assumes control and in this module, the Virtual Device Driver 218 modifies the file-open request to point to the local storage on the client 202 for opening the downloaded copy of the file. The Modify Request module 508 then passes control to the Native File System module 505.

If in the Test New Condition module 506 the condition tests true (YES), the file-open request is made to a file that has not been previously requested and downloaded from the FTP server 224 to the local storage on the client 202. Hence, a Request FTP module 510 assumes control and in this module, the Virtual Device Driver 218 provides input to the FTP Client 220 to establish communications with the FTP Server 224 for downloading the file from the FTP Server 224. The Virtual Device Driver 218 then receives from the FTP Client 220 the file and causes the file to be stored on the local storage on the client 202. The Modify Request module 508 assumes control thereafter.

If during the operation of the Sustain Session process 306, the computer user decides to exit the mobile computing environment account, the Sustain Session process 306 terminates and the Terminate Session process 308 commences.

The Terminate Session process 308 begins with an Instruct FTP module 602 where the Account Manager 214 provides input to the FTP Client 220 to propagate modified files and directories back to the FTP Server 224. The FTP Client 220 hence establishes communications with the FTP Server 224 for such a purpose. Thereafter, the Instruct FTP module 602 passes control to an Instruct Native File System module 604.

In the Instruct Native File System module 604, the Account Manager 214 provides input to the Native File System 212 for deleting all files and directories downloaded from the FTP Server 224 during the Sustain Session process 306. The Account Manager 214 then in a Terminate FTP module 606 terminates the Virtual Device Driver 218 and the FTP Client 220.

An Unmap module 608 subsequently assumes control and in this module, the Account Manager 214 undoes the new directory mapping 720 through processing the mobile desktop drives by using a WINDOWS™ or compatible operating system "net use drive /d" command or a DOS "subst drive /d" command. After completion, the Unmap Module 608 passes control to a Record module 610.

In the Record Documents module 610, the Account Manager 214 records shortcuts to mobile desktop documents in the \WINDOWS™ or compatible operating system\Recent directory on the Profile server 222 and then deletes the shortcuts from the directory. Similarly, the Account Manager 214 records shortcuts to mobile desktop application programs and documents in the \WINDOWS™ or compatible operating system\Desktop directory on the Profile Server 222 and thereafter deletes the shortcuts from the directory after a Record Application Programs module 612 assumes control from the Record Documents module 610.

Subsequently in a Write Wallpaper module 614, the Account Manager 214 writes any altered file for a changed new wallpaper 714 to the Profile Server 222 and deletes the altered file from the client 202. Thereafter in an API Reset module 616, the Account Manager 214 makes a WINDOWS™ or compatible operating system API call to reset the new wallpaper 714 on the desktop 704 to the wallpaper 706.

The Terminate Session process 308 ends with a Terminate Operation module 618 where the Account Manager 214 is terminated. The client 202 is hence restored to the WINDOWS™ or compatible operating system computing environment before the personalized WINDOWS™ or compatible operating system computing environment was attached to the client 202.

In another embodiment, the client 202 supports a plurality of file access protocols, which are implemented by an FTP client and a HTTP client in the File Monitor 216, together with SMB and NFS clients layered below the Native File System 212. When a request for a file on a remote storage server is received, the VxD 218 selects one of the protocols to service the request as follows. First, the VxD 218 compares the IP address of the client 202 with a list of network addresses that the remote storage server supports for each protocol. Next, a protocol is chosen from those protocols that the client 202 is allowed to use, according to a pre-specified ranking (for example, SMB over NFS over FTP over HTTP, because the SMB and NFS protocols are more efficient than FTP and HTTP protocols). Once a protocol is chosen, the VxD 218 routes the file request to the corresponding file access client.

The foregoing protocol selection mechanism enables files to be accessed using the most preferred protocol, taking into account characteristics of the current network connection such as whether there is a firewall between the client 202 and the remote storage server.

DESCRIPTION OF THE FILE MONITOR

Figure 8:
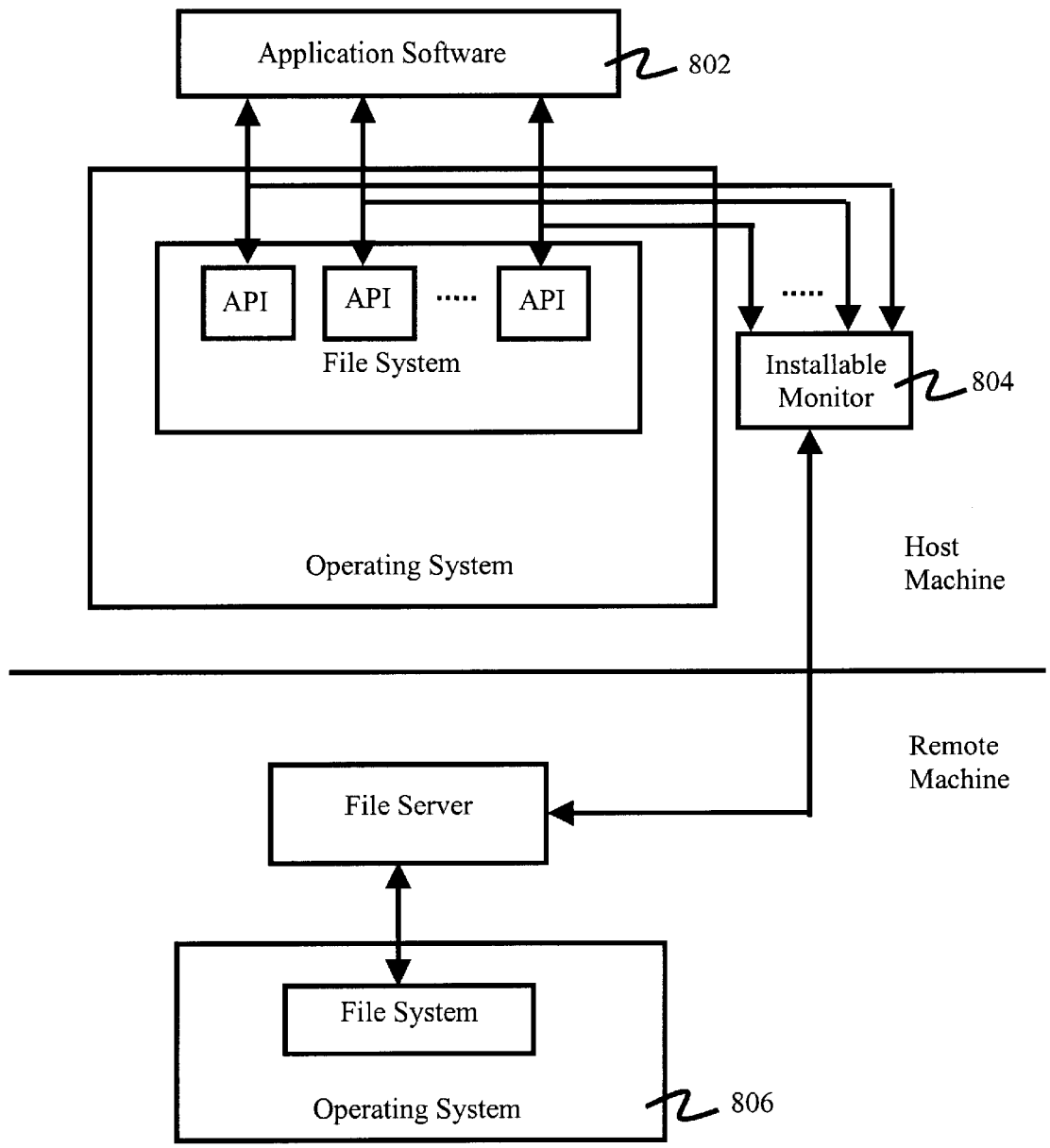
FIGS. 8 and 9 are block diagrams illustrating the components of a computer implemented with the File Monitor of FIG. 2 for providing a detailed description of the File Monitor.

To enable a better appreciation of the File Monitor 216 and its operation, reference is made to FIG. 8 for a more detailed description. The File Monitor 216 enables software 802 to be installed and run on a host machine, without requiring the underlying files to be physically available on any of the local storage drives. Instead, every file request from the software 802 is trapped by an installable monitor 804 (the File Monitor 216), which dynamically downloads the target file from a remote file server 806 to a local storage medium if the file has not already been downloaded. The installable monitor 804 thereafter directs the native file system of the host machine to operate on the downloaded file in order to satisfy the file request. Even requests for a file at an absolute path on a specific drive (e.g. a CD-ROM drive)

are redirected to the downloaded file, which is likely to reside at a different path on a different drive. The downloaded file can optionally be removed when the software closes the file, or when the software 802 terminates. Consequently, a host machine can run application software 802 without having a physical medium containing all the underlying files.

Figure 9:
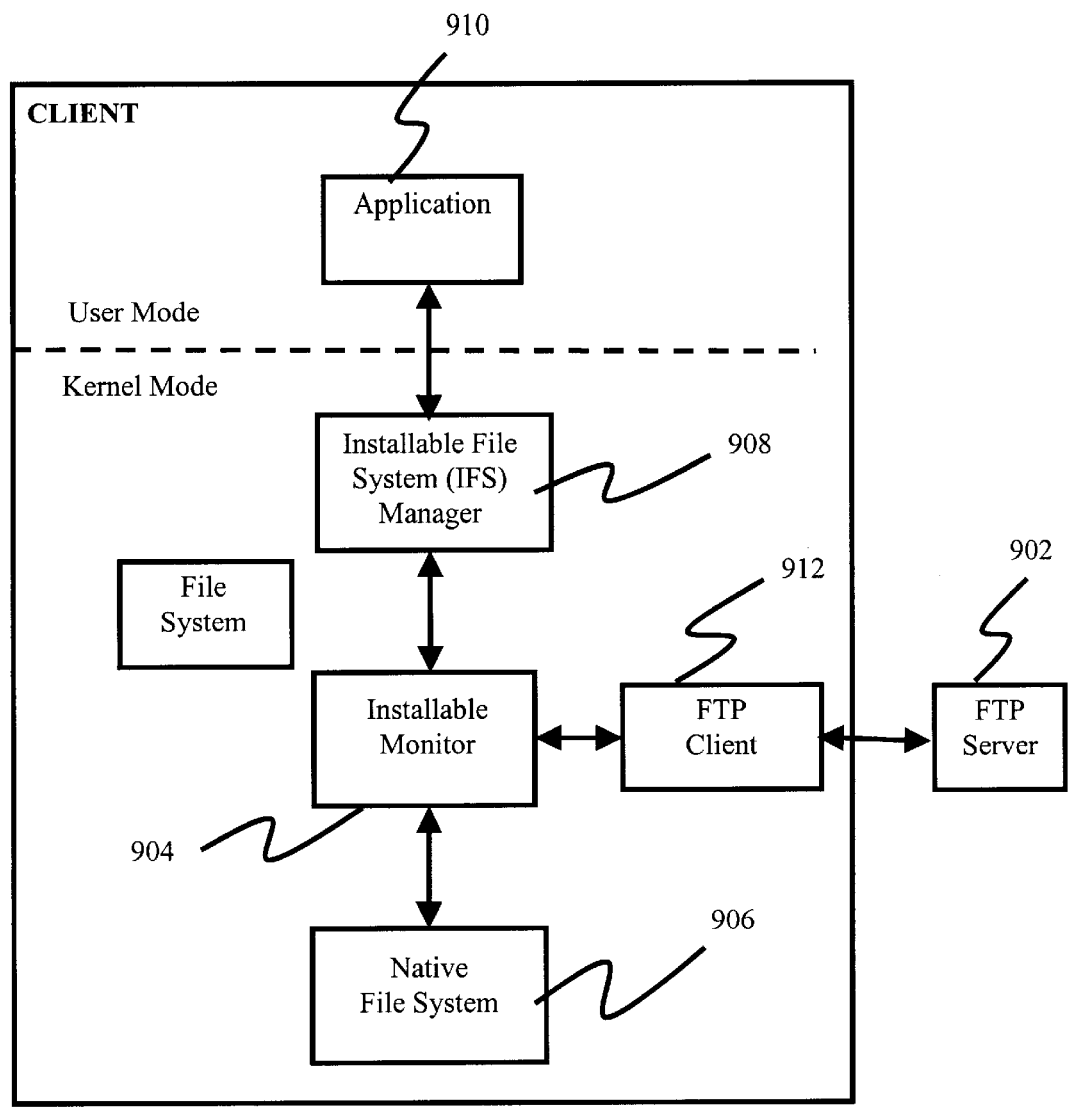

In one implementation as illustrated in FIG. 9, the file server is a standard FTP server 902 using the FTP communications protocol. The communications network is the Internet. The user's computer has WINDOWS™ or compatible operating system 95 as its operating system, and the FTP server 902 has a SOLARIS™ operating system. However, those skilled in the art should appreciate that different operating systems have similar features and functions, so that the installable monitor 804 is not limited to use only in connection with these operating systems.

The installable monitor 804 on the user's computer has two components: a virtual device driver (VxD) 904 and an FTP client 912, both inside the operating system kernel. The VxD 904 is implemented in such away that the VxD 904 is layered on top of the native file system 906. The VxD 904 is implemented as a hook that gets installed below the installable file system (IFS) manager interface 908. A hook is a programming device that alters program flow away from the original intent. Consequently, for selected program flow threads progressing through the IFS manager interface 908, program flow is routed to the VxD 904 rather than to the native file system 906 as originally intended. The VxD 904 is then free to either satisfy the request and return program flow back to the requesting thread or modify the request before directing the request to the native file system 906.

The native file system 906 may include function routines directed towards file rights, file locking, file transaction tracking and the like. These are of little importance to the installable monitor 804, and hence hooks are omitted for such functions. The selected functions for which hooks are implemented are indicated in the following table:

| CreateFile | WriteFile | FindNextFile |
|---|---|---|
| CloseFile | GetFilesize | GetFileAttributes |
| ReadFile | FindFirstFile | GetFileTime |
| CreateDirectory | DeleteFile | |

The precise processes and program flow used in hooking these function routines are unimportant for the purposes of the installable monitor 804. Such hooking may be implemented any number of different ways, as is known to those skilled in the art. For example, published information describing the operating system may indicate the definition of the IFS manager interface 908 for various function routines supported by the native file system 906. To the extent that published information is lacking, hook locations may be determined empirically.

For each function routine that is hooked, the VxD 904 blocks the execution of the request inside the kernel, determines the path name of the request issued by the application and translates the request into the equivalent remote path name on the file server 902. This remote path name is then passed back to the FTP client 912 using known event notification mechanisms. The FTP client 912 then translates the request into an FTP request and forwards the FTP request to the FTP server 902. The FTP client 912 waits for a response from the FTP server 902 and, once the file has been downloaded onto the user's machine, the FTP client 912 saves the file to another location on the user's machine's local storage media. Confirmation of the download is passed to the VxD 904, together with the location of the local copy of the file. The VxD 904 then redirects the native file system 906 to satisfy the request made by the application 910 using the local copy, and the application 910 continues as normal. The application 910 is unaware that the files and data are being accessed on-line rather than on a local CD-ROM. After the application 910 finishes execution, or closes the file, or after a predetermined number of uses or after a pre-determined number of days, (these options may be configurable) one or more or all of the downloaded files are deleted from the user's machine.

Figure 10:
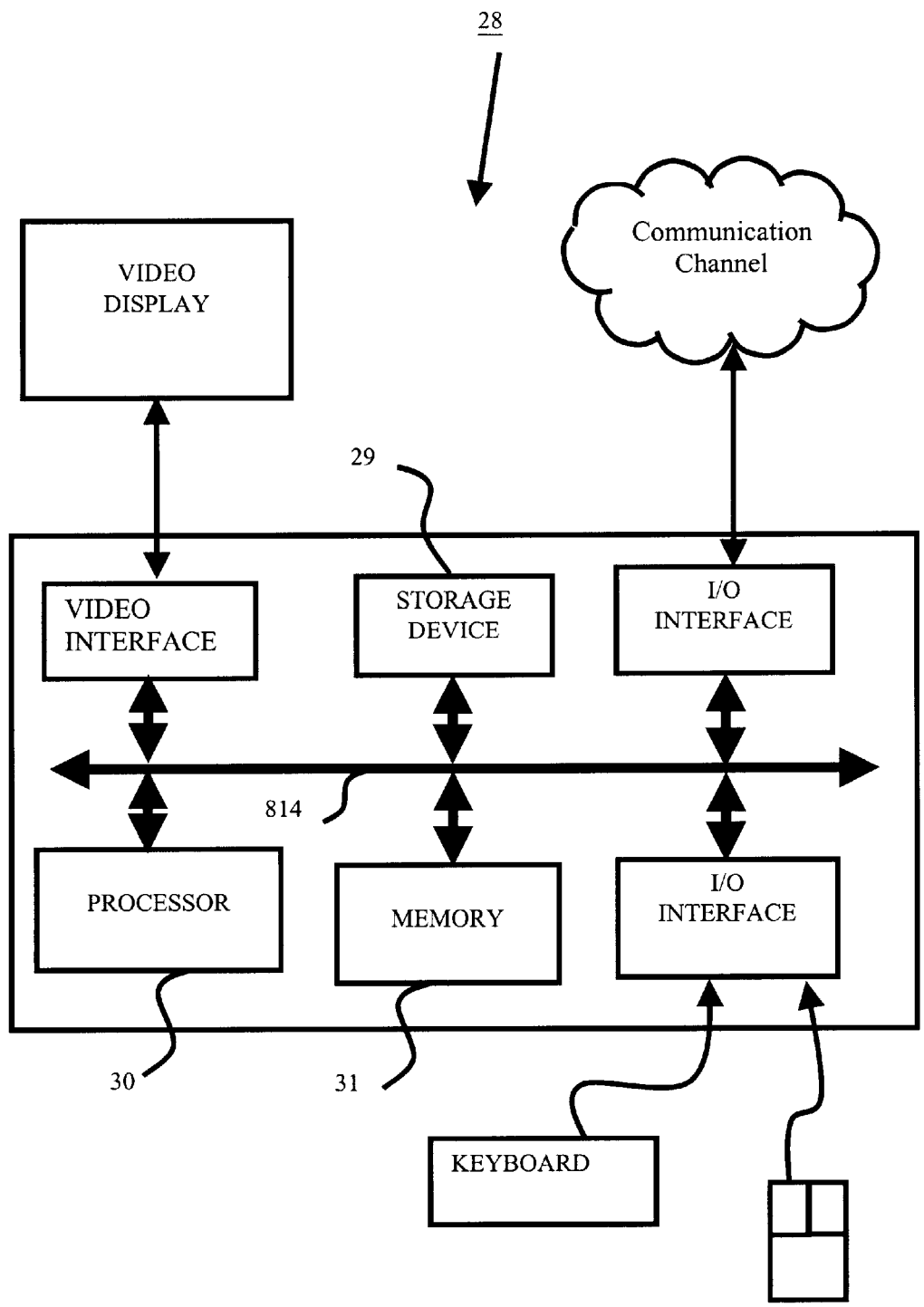
FIG. 10 illustrates a general-purpose computer by which the embodiments of the invention are preferably implemented.

The embodiments of the invention are preferably implemented using a computer, such as the general-purpose computer shown in FIG. 10. In particular, the functionality or processing of the system of FIGS. 1 to 9 can be implemented as software, or a computer program, executing on the computer. The method or process steps for migrating a mobile computing environment to a computer connectable to a mobile computing environment network are effected by instructions in the software that are carried out by the computer. The software may be implemented as one or more modules for implementing the process steps. A module is a part of a computer program that usually performs a particular function or related functions. Also, as described in the foregoing, a module can also be a packaged functional hardware unit for use with other components or modules.

In particular, the software may be stored in a computer readable medium, including the storage devices described below. The software is preferably loaded into the computer from the computer readable medium and then carried out by the computer. A computer program product includes a computer readable medium having such software, or a computer program recorded on it that can be carried out by a computer. The use of the computer program product in the computer preferably effects an advantageous apparatus for providing a low data transmission rate and intelligible speech communication in accordance with the embodiments of the invention.

The system 28 is simply provided for illustrative purposes and other configurations can be employed without departing from the scope and spirit of the invention. Computers with which the embodiment can be practiced include IBM-PC/ATs or compatibles, one of the Macintosh™ family of PCs, Sun Sparcstation™, a workstation or the like. The foregoing is merely exemplary of the types of computers with which the embodiments of the invention may be practiced. Typically, the processes of the embodiments, described hereinafter, are resident as software or a program recorded on a hard disk drive (generally depicted as block 29 in FIG. 10) as the computer readable medium, and read and controlled using the processor 30. Intermediate storage of the program and any data may be accomplished using the semiconductor memory 31, possibly in concert with the hard disk drive 29.

In some instances, the program may be supplied to the user encoded on a CD-ROM or a floppy disk (both generally depicted by block 29), or alternatively could be read by the user from the network via a modem, device connected to the computer, for example. Still further, the software can also be loaded into the computer system 28 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on Websites and the like. The foregoing is merely exemplary of relevant computer readable mediums. Other computer readable mediums may be practiced without departing from the scope and spirit of the invention.

In the foregoing manner, a computing system, a method, and a computer program product for providing portable or mobile computing within the context of a network are described. In particular, a computing environment may be migrated to any computer that is connectable to the network for providing a user with a consistent computing environment. However, it will be apparent to one skilled in the art in view of this disclosure that numerous changes and/or modification can be made without departing from the scope and spirit of the invention.

What is claimed is:

1. A computing system connectable to remote storage and having a local computing environment, an operating system, and a local storage, said computing system including:

means for enabling the migration of a mobile computing environment to the computer system to provide a consistent computing environment for a user, the mobile computing environment including a user-interface, file access, directory access and application program access; the means for enabling the migration comprising:

means for mapping the user-interface portion of the mobile computing environment onto said local computing environment using information transferred from said remote storage being connected to said system, the mapping means being actuable by said user;

a file system in said operating system for receiving and translating requests for performing file operations on said local storage; and means for monitoring and intercepting a request made to said file system for operation on a file stored on said remote storage being connected to said system, said request being actuable by the mapped user-interface;

wherein said file from said remote storage is transferred to said local storage by said monitoring means.

2. The system as in claim 1, wherein said connectivity between said system and said remote storage is provided by a communications medium.

3. The system as in claim 2, wherein said information from said remote storage is transferred by said mapping means.

4. The system as in claim 2, further including a file access protocol for providing said connectivity between said system and said remote storage, wherein said file access protocol is dynamically selectable and dependent on the file access protocol of said remote storage.

5. The system as in claim 2, wherein said mapping means is an application program actuable by said user.

6. The system as in claim 2, wherein said monitoring means includes at least two components resident in the kernel of said operating system, a first component being layered on top of said file system and a second component providing said connectivity between said system and said remote storage.

7. The system as in claim 2, wherein said communications medium is a communications network.

8. The system as in claim 7, where in said remote storage for said transferred information is a first remote storage and said remote storage for said file is stored on a second remote storage.

9. The system as in claim 8, wherein said operating system is a graphical user interface based operating system.

10. The system as in claim 9, wherein said mapping means is a graphical user interface based operating system application program, said first remote storage is provided by a Web portal and said second remote storage is a File Transfer Protocol server.

11. The system as in claim 7, wherein said mobile computing environment is a graphical user interface based operating system computing environment which includes at least one of a wallpaper, a plurality of desktop icons, a plurality of program and document shortcuts, a clipboard or cache, a registry, and a plurality of directory mappings.

12. The system as in claim 1, wherein said monitoring means further modifies said request to point to said file stored on said local storage and passes said modified request to said file system.

13. A method of providing a consistent computing environment for a user of a computing system, said computing system being connectable to remote storage and having a local computing environment, an operating system, and a local storage, said method comprising:

migrating a mobile computing environment to the computing system to provide the consistent computing environment for the user, the mobile computing environment including a user-interface, file access, directory access and application program access; the migrating step comprising the steps of:

mapping the user-interface portion of the mobile computing environment onto said local computing environment, the mapping step including transferring information stored on said remote storage being connected to said computing system, and using the transferred information for mapping said user-interface, said mapping step being actuated by said user;

receiving and translating requests in a file system in said operating system for performing file operations on said local storage; and monitoring and intercepting a request made to said file system for operation on a file stored on said remote storage being connected to said computing system, said request being actuated by said mapped user interface;

wherein said monitoring step includes transferring said file from said remote storage to said local storage.

14. The method as in claim 13, further including the step of providing connectivity between said computer system and said remote storage using a communications medium.

15. The method as in claim 14, further including the step of providing a file access protocol to connect said computing system to said remote storage.

16. The method as in claim 15, wherein said providing step includes selecting dynamically said file access protocol, said selection being dependent on the file access protocol of said remote storage.

17. The method as in claim 14, wherein said monitoring step further includes layering a first component on top of said file system in said operating system, and connecting said computing system and said remote storage using a second component, wherein both said components are resident in the kernel of said operating system.

18. The method as in claim 14, wherein said step of providing connectivity using said communications medium includes using a communications network.

19. The method as in claim 18, wherein said mapping and monitoring steps further include connecting said computing system to a first remote storage and a second remote storage respectively.

20. The method as in claim 19, wherein said mapping and monitoring steps further include connecting said computing system to a web portal and a File Transfer Protocol server respectively.

21. The method as in claim 20 providing a mobile computing environment in relation to a graphical user interface based operating system which includes at least one of a wallpaper, a plurality of desktop icons, a plurality of program and document shortcuts, a clipboard or cache, a registry, and a plurality of directory mappings.

22. The method as in claim 13, wherein said monitoring step further includes modifying said request to point to said file stored on said local storage.

23. The method as in claim 22, wherein said monitoring step further includes passing said modified request to said file system.

24. A computer program product for providing a consistent computing environment for a user, comprising:
a computer usable medium having computer readable program code means embodied in said medium for causing migration of a mobile computing environment to a computing system, including a user interface, file access, directory access and application program access, said computing system being connectable to remote storage and having a local computing environment, an operating system, and a local storage, the computer readable program code means including:
code means for mapping the user interface portion of said mobile computing environment onto said local computing environment, including transferring information stored on said remote storage being connected to said computing system, and using the transferred information for mapping said user-interface, the step of mapping being actuated by said user;
code means for receiving and translating requests in a file system in said operating system for performing file operations on said local storage; and
code means for monitoring and intercepting a request made to said file system for operation on a file stored on said remote storage being connected to said computing system, said request being actuated by said mapped user-interface;
wherein said code means for monitoring includes means for transferring said file from said remote storage to said local storage.

25. The computer program product as in claim 24, further including computer readable program code means for providing connectivity between said computer system and said remote storage using a communications medium.

26. The computer program product as in claim 25, further including computer readable program code means for providing a file access protocol to connect said system to said remote storage.

27. The computer program product as in claim 26, wherein said computer readable program code means for providing includes means for selecting dynamically said file access protocol, said selection being dependent on the file access protocol of said remote storage.

28. The computer program product as in claim 25, wherein said computer readable program code means for monitoring further includes
computer readable program code means for layering a first component on top of said file system in said operating system, and
computer readable program code means for connecting said computing system to said second remote storage using a second component,
wherein both said components are resident in the kernel of said operating system.

29. The computer program product as in claim 25, wherein said computer readable program code means for providing connectivity using said communications medium includes means for using a communications network.

30. The computer program product as in claim 29, wherein said mapping and monitoring means further include means for connecting said computer system to a first remote storage and a second remote storage respectively.

31. The computer program product as in claim 30, wherein said mapping and monitoring means further include means for connecting said computing system to a web portal and a File Transfer Protocol server respectively.

32. The computer program product as in claim 31, further including computer readable program code means for providing a mobile computing environment in relation to a graphical user interface based operating system which includes at least one of a wallpaper, a plurality of desktop icons, a plurality of program and document shortcuts, a clipboard or cache, a registry, and a plurality of directory mappings.

33. The computer program product as in claim 24, wherein said computer readable program code means for monitoring further includes means for modifying said request to point to said file stored on said local storage.

34. The computer program product as in claim 33, wherein said computer readable program code means for monitoring further includes means for passing said modified request to said file system.

35. A computing system connectable to remote storage and having an operating system that provides a local user-interface and controls a local storage, said computing system including:
means for enabling the migration of a mobile computing environment to the computing system, the mobile computing environment including a user-interface, file access, directory access and application program access, the means for enabling the migration comprising:
an arbitrator means in said operating system for arbitrating access to files, directories, and information for locating and accessing said files and directories;
an account manager means communicable with said arbitrator means and said remote storage for mapping the user-interface portion of said mobile computing environment onto said local user-interface using information stored on said remote storage;
a file system in said operating system for receiving and translating requests for performing file operations on said local storage; and
a file monitor means for intercepting a request made to said file system for operation on a file stored on said remote storage, and redirecting said request to said remote storage, wherein said request is actuated through the mapped local user-interface;
wherein said file from said remote storage is transferred to said local storage by said file monitor means.

36. The system as in claim 35, further including a file access protocol for providing said connectivity between said system and said remote storage, wherein said file access protocol is dynamically selectable and dependent on the file access protocol of said remote storage.

37. The system as in claim 36, wherein said account manager means is an application program.

38. The system as in claim 37, wherein said file monitor means includes at least two components residing in the kernel of said operating system, where a first component is layered on top of said file system and a second component provides said connectivity between said system and said remote storage.

39. The system as in claim 38, wherein said remote storage includes at least two remote storage devices, where a first remote storage device is logically connected to said application program and a second remote storage device is logically connected to said second component.

40. The system as in claim 39, wherein said operating system is a graphical user interface based operating system.

41. The system as in claim 40, wherein said application program is a graphical user interface based operating system application program and said first remote storage is provided by an Internet port resident on a Web server, and said first and second components of said file monitor means are graphical user interface based operating system kernel components and said second storage is a File Transfer Protocol server.

42. The system as in claim 39, wherein said mobile computing environment is a graphical user interface based operating system computing environment that includes at least one of a wallpaper, a plurality of desktop icons, a plurality of program and document shortcuts, a clipboard or cache, a registry, and a plurality of directory mappings.

* * * * *